United States Patent [19]

Romano

[11] Patent Number: 5,134,845
[45] Date of Patent: Aug. 4, 1992

[54] CONTROL FOR A GAS TURBINE ENGINE

[75] Inventor: Timothy J. Romano, River Forest, Ill.

[73] Assignee: United Technologies Corporation, Hartford, Conn.

[21] Appl. No.: 555,889

[22] Filed: Jul. 23, 1990

[51] Int. Cl.[5] .................................................. F02C 9/28
[52] U.S. Cl. ..................................................... 60/39.281
[58] Field of Search ........................................ 60/39.281

[56] References Cited

U.S. PATENT DOCUMENTS

| 4,423,592 | 1/1984 | Evans | 60/39.161 |
| 4,442,667 | 4/1984 | MacIsaac | 60/39.281 |
| 4,449,360 | 5/1984 | Evans | 60/39.281 |
| 4,543,782 | 10/1985 | Fitzmaurice | 60/39.281 |

Primary Examiner—Louis J. Casaregola
Attorney, Agent, or Firm—Norman Friedland

[57] ABSTRACT

This invention eliminates overshoot of critical engine operating limits by preventing windup in a control system thus avoiding the difficulties of maintaining stability or transient response associated with conventional dynamic compensation. A slave-datum controller is limited by imposing a limit indicative of the distance between the engine's operating line and the maximum or minimum constraints imposed on the engine to avoid surge and combustor "blowout".

6 Claims, 8 Drawing Sheets

CONTROL FOR A GAS TURBINE ENGINE

The invention was made under a U.S. Government contract and the Government has rights herein.

DESCRIPTION

1. Technical Field

This invention relates to gas turbine engines and particularly to a slave-datum type engine control system where the control output is limited by minimum and maximum constraints, and engine operation is governed by critical engine operating limits.

The invention presented in this disclosure eliminates overshoot of critical engine operating limits caused by the inherent windup effect in this type of controller as the engine is concurrently accelerating (decelerating) on the maximum (minimum) constraint.

The invention presented in this disclosure prevents windup, and thus eliminates overshoot of critical engine operating limits without introducing difficulties of maintaining stability or transient response associated with conventional dynamic compensation.

2. Background Art

As is well known, it is customary to utilize a slave-datum controller for a gas turbine control so as to attain complete automation in the control system. The slave-datum control serves to produce an output in response to an input request while holding output within given constraints.

FIG. 1 shows a typical slave-datum type controller. The control system consists of a speed governor control loop (block 2) whose input is a slave-datum set by speed request and critical engine operating limits through the slave control loop integrator (integrator is within slave control loop, block 1). MAX/MIN constraints are imposed (block 3) on the output of the speed governor control loop to prevent combustor blowout and compressor stall.

As an gas turbine engine fuel control, the slave-datum controller regulates fuel flow to the combustor in order to control compressor speed to a set value, while preventing overshoot of critical temperature, speed, and pressure limits during transient excursions and steady state operation. The MAX/MIN constraints prevent stall and burner flameout during transient excursions.

Although a slave-datum controller is ordinarily efficacious when used on systems where constraints are required, difficulties with the controller involve overshoots of critical engine operating limits (temperature, pressure, speed) concurrently with the system (controller and engine) accelerating (decelerating) on the MAX (MIN) constraint. Overshoots are caused by the inherent windup effect of the slave loop integrator (integrator is within slave control loop, block 1) in this type of controller.

The problem can be best understood by referring to FIGS. 2, 3, and 4.

FIG. 2 illustrates, in more detail, the prior art slave-datum type engine control system, it being understood that the problem is also inherent in controllers that modulate other parameters. As noted, the slave control loop outputs the slave-datum to summer 7 within the speed governor control loop. The slave-datum is the integrated result (block 6) of the difference between speed request and current slave-datum (summer 4), or between the critical engine operating limits and the critical limit feedbacks (summer 3), whichever is selected (block 5). The slave loop integrator gain (K, block 6) is the overall loop gain of the slave control loop, and is sized for response and stability. The speed request signal is usually obtained through pilot requested throttle position and flight condition (i.e., ambient temperature and pressure). Critical engine operating limits include MAX/MIN speeds, pressures, and temperatures.

Within the speed governor control loop, KOP (block 8) is the slope of the engine operating line which will be assumed to be constant over the entire engine operating range. The operating line is the relationship between engine speed and control output required to maintain steady state operation. KP (block 9) is the slope of the speed governor line, and is called the proportional governor gain. KP is sized to provide fast response during transient excursions while providing adequate stability margin. Integral trim (KI/S, block 11) is required to null the speed error thus providing steady state accuracy. KI is also sized for adequate stability.

The speed governor control loop sets, or schedules the engine steady state operating point via the engine operating line as a function of the slave-datum (resultant output of block 8). The slave-datum is compared to speed feedback (summer 7) thus forming a speed error. The speed error is multiplied to the proportional trim gain (KP, block 9) and applied to the scheduled operating point, at summer 10, thus forming a speed governor line through the operating line at the speed requested by the slave-datum (resultant of summer 10). Integral trim (KI/S, block 11) is applied, at summer 12, to null the speed error thus providing steady state accuracy. The speed governor request (resultant of summer 12) is limited by MAX/MIN constraints (block 13), for consideration of stall margin and combustor blowout during gross transient operation, thus obtaining the control output. The control output drives a mechanical fuel metering device to regulate fuel flow to the engine.

The steady state operation and transient trajectories of the prior art control system of FIG. 2 are graphically illustrated as shown in FIG. 3, which depicts a plot of the control output: vs. Compressor speed. In this graph, line L represents the engine operating line which is characteristic to a particular engine. As previously stated, KOP (reference FIG. 2) is the slope of line L and will be assumed to be constant slope throughout the engine operating range. Lines O, P, Q, R, and S are all speed governor lines. All these lines have a slope of KP (reference FIG. 2) and will be assumed to be a constant slope throughout the engine operating range. Line Z represents the maximum constraint imposed for consideration of stall margin, and line M represents the minimum constraint imposed for consideration of combustor blowout.

Steady state idle operation corresponds to point A, while steady state full power operation corresponds to point H. When the engine is operating at steady state idle, the speed request, slave-datum and the engine feedback positions are all at idle (points Ia, Ya, and Ea on ordinate axis). The control output corresponds to point A on line L. The speed governor line (line O) is set by the slave-datum and projected through point A on line L at slave-datum speed Ya. Point Za is the MAX constraint level scheduled from line Z, and will be assumed to be a function of only engine feedback position. Since the slave-datum and the engine feedback positions are both at idle, there is no speed error. Therefore, the speed governor request and control output are the same, and is the amount corresponding to point A on line L.

During a rapid change in speed request (i.e., transient) from idle to full power, the speed request moves immediately and requests full power speed (point Ih on ordinate axis). The slave-datum follows speed request (points Ya, Y1, Y2, Y3, and Yh, on the ordinate axis) and schedules engine operating points A, A1, A2, A3, and H, on line L, with respective speed governor lines O, P, Q, R, and S.

To clarify transient operation, it will be assumed the MAX constraint level (line Z) is a function of only engine feedback position, and that the engine does not accelerate until after the slave-datum reaches full power (point Yh on ordinate axis). Therefore, the engine feedback position remains at idle (point Ea on ordinate axis) and schedules a constant MAX constraint level (point Za on line Z) until the slave-datum reaches full power at which time the engine feedback begins to accelerate.

Based on the above assumption, as the slave-datum approaches full power (trajectory points Ya, Y1, Y2, Y3, and Yh), the engine feedback position remains at idle (point Ea) and schedules points Za from line Z. A speed error is generated between the slave-datum and speed feedback positions, which results in speed governor lines O, P, Q, R, S scheduling speed governor request points A, B, C, D, and F respectively. However, due to the maximum constraint (line Z) imposed, the control output is limited to point Za.

Because the slave control loop (reference FIG. 1, block 1) is "unaware" of the maximum constraint imposed on the speed governor request (reference FIG. 1, block 3), the slave control loop continued to move (windup) the slave-datum. Consequently, the speed governor request schedules beyond the maximum constraint (points C, D, F), thus generating excess output. Excess output is the difference between the speed governor request and the maximum constraint level. For example, when the slave-datum request is at point Y2 and engine feedback is at point Ea, the speed governor request corresponds to point C. The excess output is the difference between point C and point Za. Therefore when the slave-datum is requesting full power (point Yh) and the engine has not yet begun to accelerate (i.e., engine feedback is at idle, point Ea), the speed governor request corresponds to F, and accordingly the excess output is the difference between point F and point Za.

As the engine accelerates from idle to full power, the speed governor request is scheduled along arrowed line ABCDFF1F2GH, while the control output is scheduled along arrowed line ABZaZ1Z2GH. As the engine feedback accelerates along points Ea, E1, E2, Eg, and Eh, the "excess output differences" are (F−Za), (F1−F1), and (F2−Z2). There is no excess output at point G or H. At point H, the engine is operating at steady state full power. Since the slave-datum and the engine feedback positions are both at full power (points Yh and Eh respectively on ordinate axis), there is no speed error. Therefore, the speed governor request and control output are identical (i.e., the amount corresponding to point H on line L).

An identical result occurs during a snap change in speed request from full power to idle. For sake of convenience and simplicity, only a single direction (acceleration) has been illustrated in FIG. 3. The minimum constraint line (line M) is provided in FIG. 3 to show how the maximum constraint (line Z), operating line (line L), and the minimum constraint (line M) are related to each other.

As is apparent from the foregoing, there are difficulties encountered with the current method of controlling the gas turbine engine. The difficulties involve overshoots of critical engine operating limits when a critical limit is reached concurrently with the engine accelerating (decelerating) on the maximum (minimum) constraint. Overshoots are caused from the excess output generated from windup of the slave-datum. Excess output is the difference between the speed governor request and the maximum constraint level.

The cause of the problem is the same whether the engine is accelerating on the maximum constraint or decelerating on the minimum constraint. For sake of convenience and simplicity, only a single direction (acceleration) will be described to illustrate the problem.

Reference is made to FIG. 4 which illustrates the disadvantage inherent in the current method. Like reference letters represent identical lines and points illustrated in FIG. 3.

In FIG. 4, the dashed line represents the critical operating limit. During a rapid change in speed request from idle to full power, the trajectories of the speed request, slave-datum, engine feedback, speed governor request, and control output are identical to the FIG. 3 illustration until the critical limit is reached. The critical limit is reached at the point where the dashed line and the maximum constraint intersect (point Z2). At this point, the slave-datum is in a condition of windup. The amount of excess output present is the difference between speed governor request point F2 and maximum constraint point Z2. The slave control loop responds to engine exceeding the critical limit by trimming back the slave-datum (points Yh, Yi, Yj on ordinate axis) to reposition the speed governor line (lines S, T, and U). However due to the excess output generated by slave-datum windup, the engine will not respond to control action, and will continue to ride the MAX constraint (point Z2 to Zi), thus exceeding the critical limit. The engine will not respond to control action until the excess output is removed (point Zi). From point Zi to Aj, the engine is responding to control action, but the critical limit is being exceeded along trace Z2ZiAj.

Point Aj is where steady state engine operation will occur. Since the slave-datum and the engine feedback positions are both at the same speed level (points Yj and Ej respectively on ordinate axis), there is no speed error. Therefore, the speed governor request and control output are the same, and is the amount corresponding to point Aj on line L.

As is apparent from the foregoing and by way of summary, the speed request moves immediately and requests full power speed. The slave-datum follows speed request and schedules the speed governor and control output as described in FIG. 3. As the engine is running the maximum constraint, excess output is generated due to slave-datum windup. If a critical operating limit is reached (point Z2 on line Z), the slave control loop will trim back the slave-datum to reposition the speed governor line, but due to the excess output is generated, the engine will not respond to control action. The engine will continue to ride the MAX constraint (point Z2 to Zi) and thus overshoot the critical limit until the slave-datum is trimmed back (line S to line T) enough to remove the excess output (point Zi on line Z). Once the excess output is removed, the engine will respond to control action, but will continue to exceed the critical limit until the speed governor is positioned at the intersection of the operating line (line L) and the critical limit (dashed line). The speed governor request schedules along arrowed line ABCDFF1F2ZiAj. The engine accelerates along arrowed line ABZaZ1Z2ZiAj.

The solution to the problem is to eliminate windup of the slave-datum. In accordance with this invention, the speed governor request exactly follows the maximum or minimum constraints, thus preventing excess output from being generated. With excess output eliminated, the engine will respond immediately to control action once a critical engine limit is reached, thus eliminating overshoot of the critical operating limit.

I have found that I can eliminate slave-datum windup and obviate the problems noted above without introducing difficulties of stability or transient response associated with conventional dynamic compensation.

DISCLOSURE OF THE INVENTION

An object of this invention is to provide an improved slave-datum controller for a gas turbine engine to eliminate overshoot of critical engine operating limits caused by the inherent windup effect in this type of controller as the engine is concurrently accelerating (decelerating) on the maximum (minimum) constraint.

A feature of this invention is the slave-datum controller for controlling the request of a control parameter in an engine control system that is limited by the distance to the maximum and minimum constraints dictated by the engine being controlled.

Another feature of this invention is the elimination of windup by limiting the slave-datum such that the speed governor request exactly follows the maximum and minimum constraints.

Another feature of this invention is that the maximum and minimum constraints can also be limits imposed on the slave-datum control that are required for successful engine starts.

The foregoing and other features and advantages of the present invention will become more apparent from the following description and accompanying drawings.

BEST MODE FOR CARRYING OUT THE INVENTION

Figure 1:
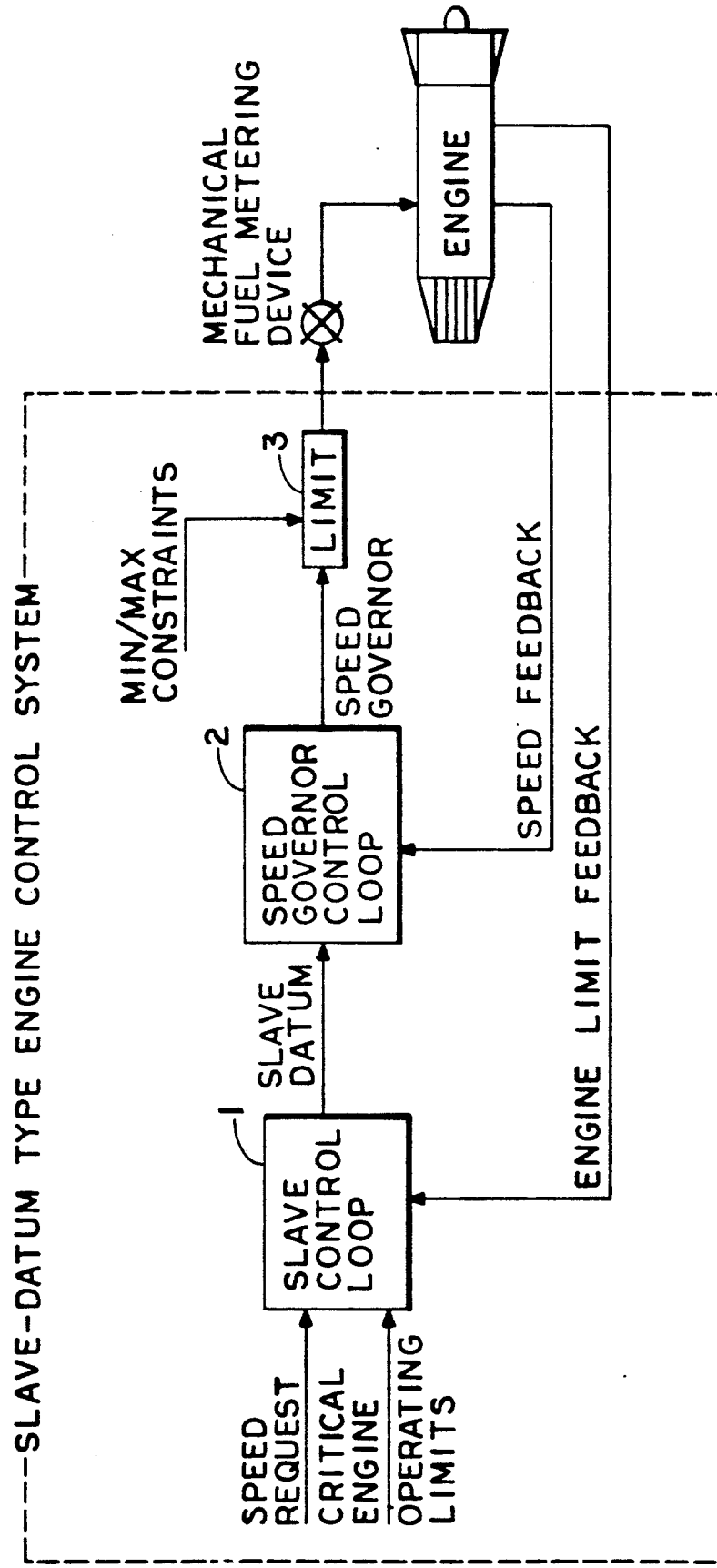
FIG. 1 is a block diagram showing a prior art typical control system using a slave-datum controller.

While this invention is shown in its preferred embodiment of a slave-datum controller for a speed governor control for a gas turbine engine, it will be understood, by those skilled in the art, that this invention can be employed with a slave-datum controller utilized for other control parameters. The implementation of this invention may be done by analog or digital means employing mediums such as electronics, hydraulics, hydro-mechanics and the like. However, the preferred embodiment of this invention may be done by aircraft gas turbine engines such as the PW2037 or F100 family of engines manufactured by Pratt & Whitney Division of United Technologies Corporation, the assignee of this patent application.

As was emphasized in the above, and as will be more fully understood from the description to follow, this invention eliminates slave-datum windup without introducing difficulties of maintaining stability or transient response associated with conventional dynamic compensation. This invention eliminates windup by limiting the slave-datum such that the speed governor request exactly follows the maximum or minimum constraints. This will prevent excess output from being generated and allow the engine to respond immediately to control action once a critical limit is reached, thus eliminating overshoot of critical engine operating limits.

The idea of this invention, namely "Slave-Datum Limit Control" is based on the appreciation that the distance from the steady state engine operating point (a.k.a engine operating line) to the MAX and MIN constraints represents the additional amount of speed governor request relative to the engine operating line to exactly reach the MAX/MIN constraints. This distance is converted into a speed request level and imposed as a limit on the slave-datum.

There are no concerns of stability or transient response, since the "Slave-Datum Limit Control" can not overcorrect the slave-datum position as could happen with conventional dynamic compensation. The "Slave-Datum Limit Control" exactly calculates the speed request level such that the speed governor request exactly follows the maximum or minimum constraints. Since the speed governor request will exactly follow the MAX/MIN constraint, no excess output will be generated. This will allow the engine to respond immediately to control action once a critical limit is reached, thus eliminating overshoot of critical engine operating limits.

No additional biases are required. The elements of the "Slave-Datum Limit Control" are existing components of the current gas turbine engine control which are already biased. Therefore, the speed request level exactly adjusts as the engine accels/decels (i.e., changes in speed feedback), and as the "operating line-MAX/MIN constraint" distance and speed governor line slope change with time and/or operating condition.

Another unique feature of this invention is that the MAX/MIN constraints can also be limits required during starting to allow successful starts to minimum temperature, pressure, or speed levels.

Figure 5:
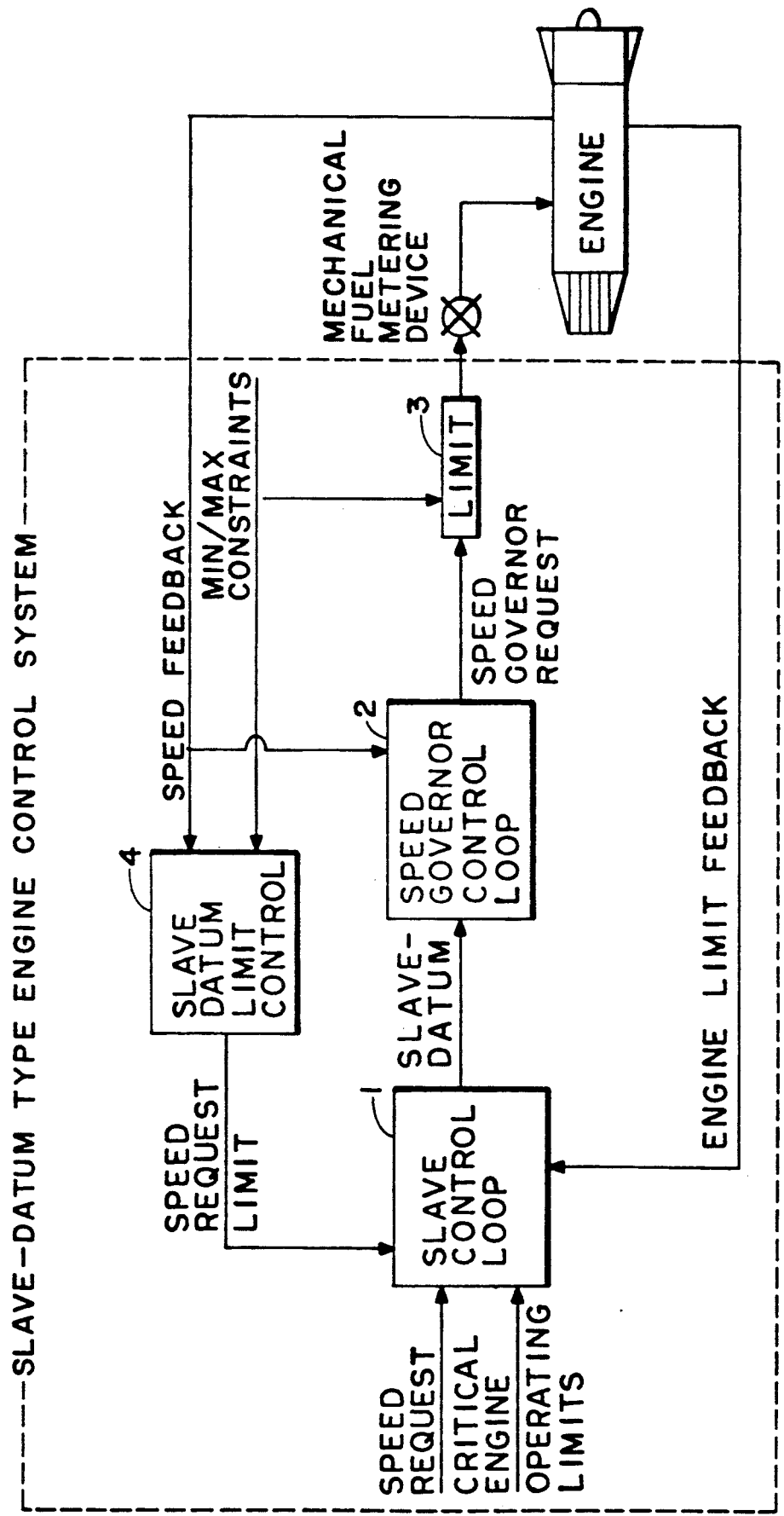
FIG. 5 is a block diagram of the speed controller of FIG. 1 employing the invention.

As noted in FIG. 5, the prior art system of FIG. 1 is modified to incorporate the "Slave-Datum Limit Control" (block 4). FIG. 5 shows how the inputs and outputs of the "Slave-Datum Limit Control" are interconnected with the prior art slave-datum control system.

Figure 2:
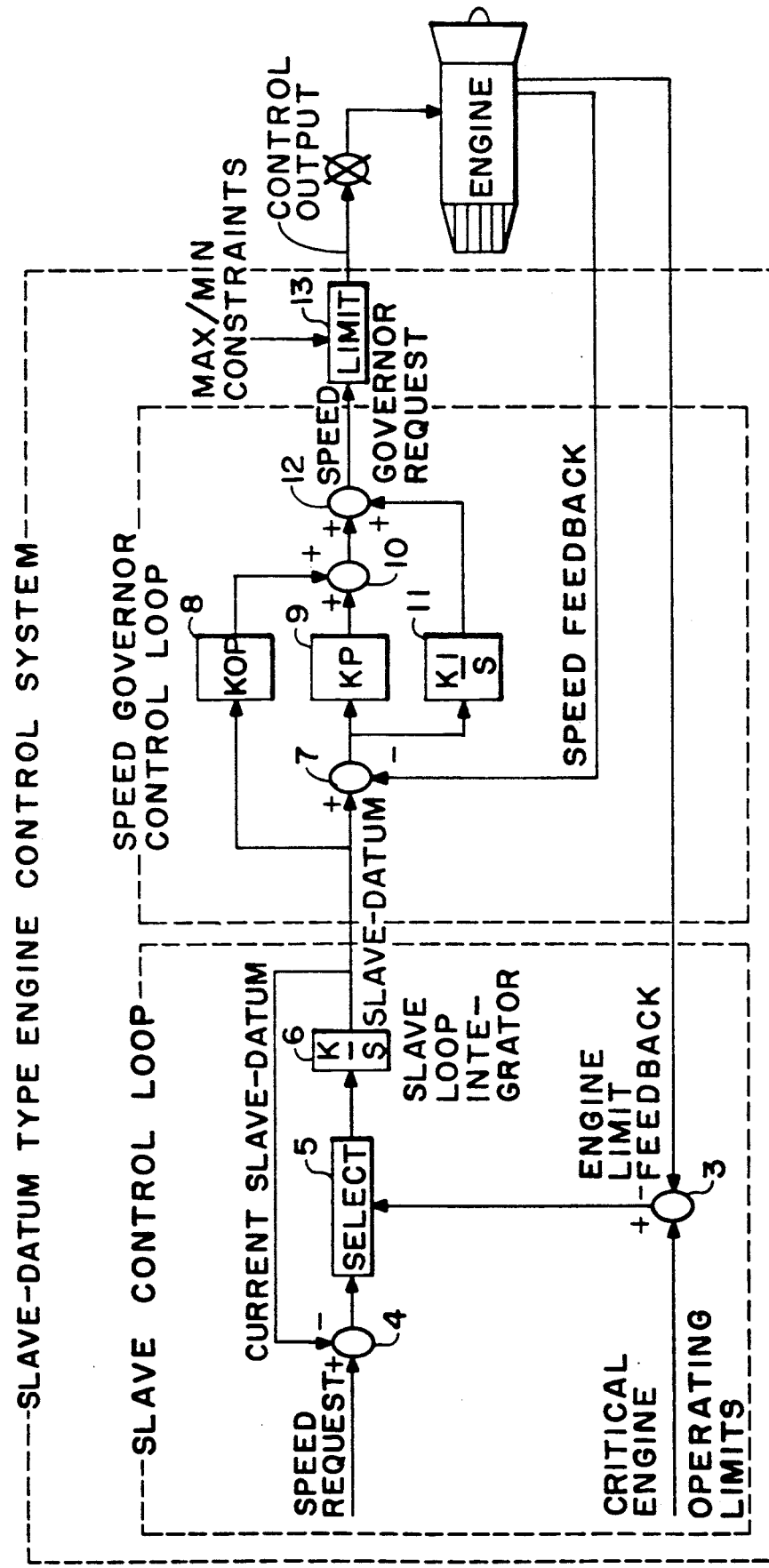
FIG. 2 is a block diagram showing the logic circuitry of a typical control system using a slave-datum controller.
Figure 3:
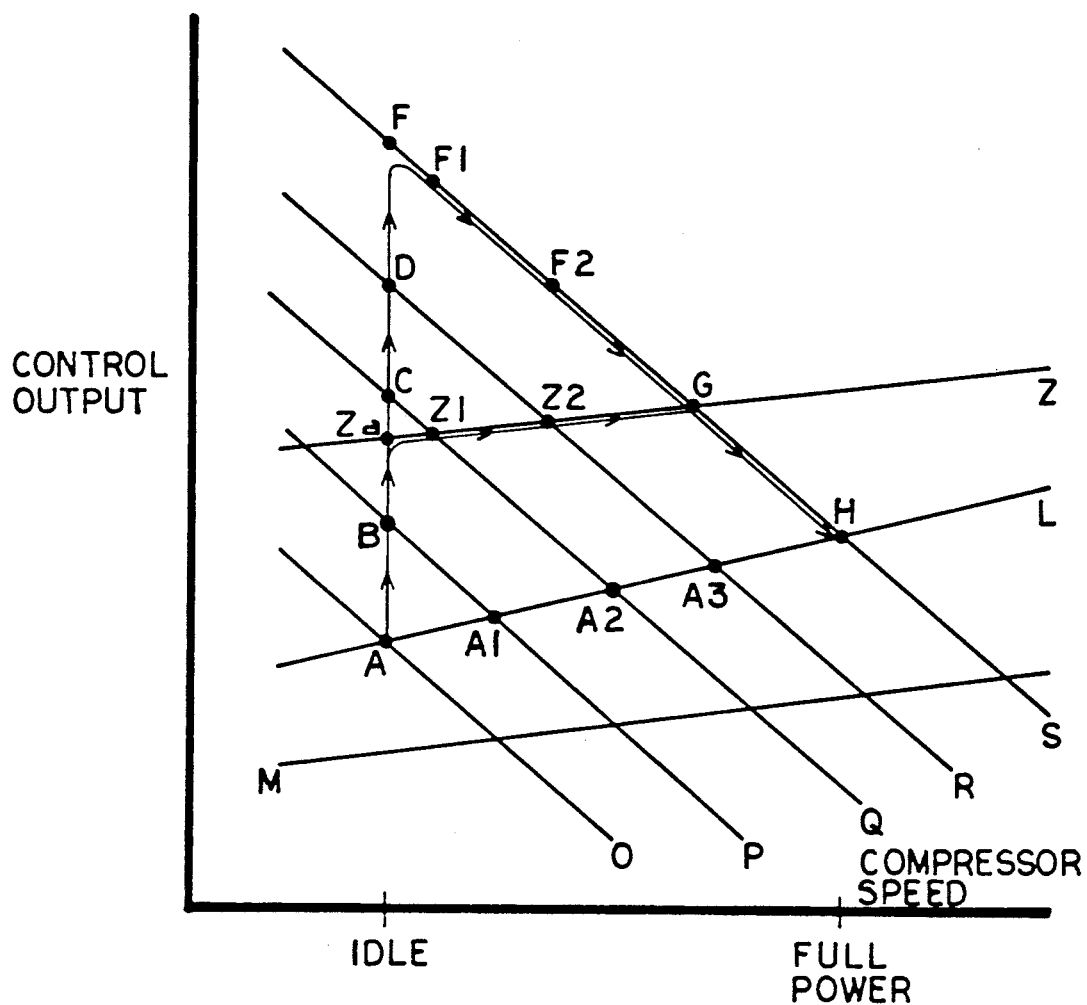
FIG. 3 is a graphical illustration of a plot of control vs compressor speed showing the windup problem inherent in the prior art system of FIG. 2.
Figure 3:
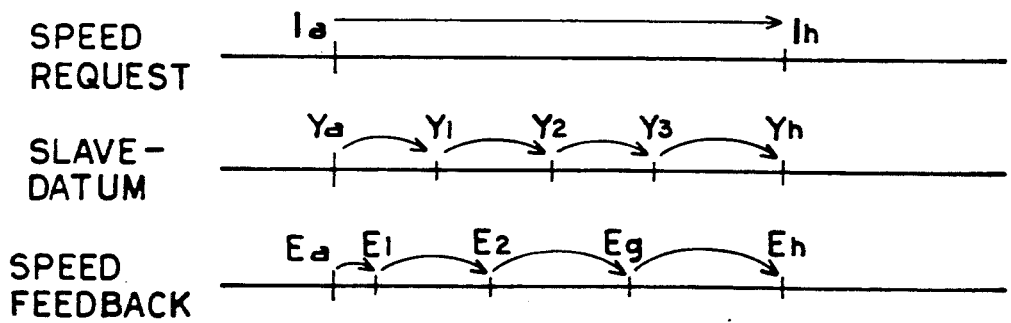
Figure 4:
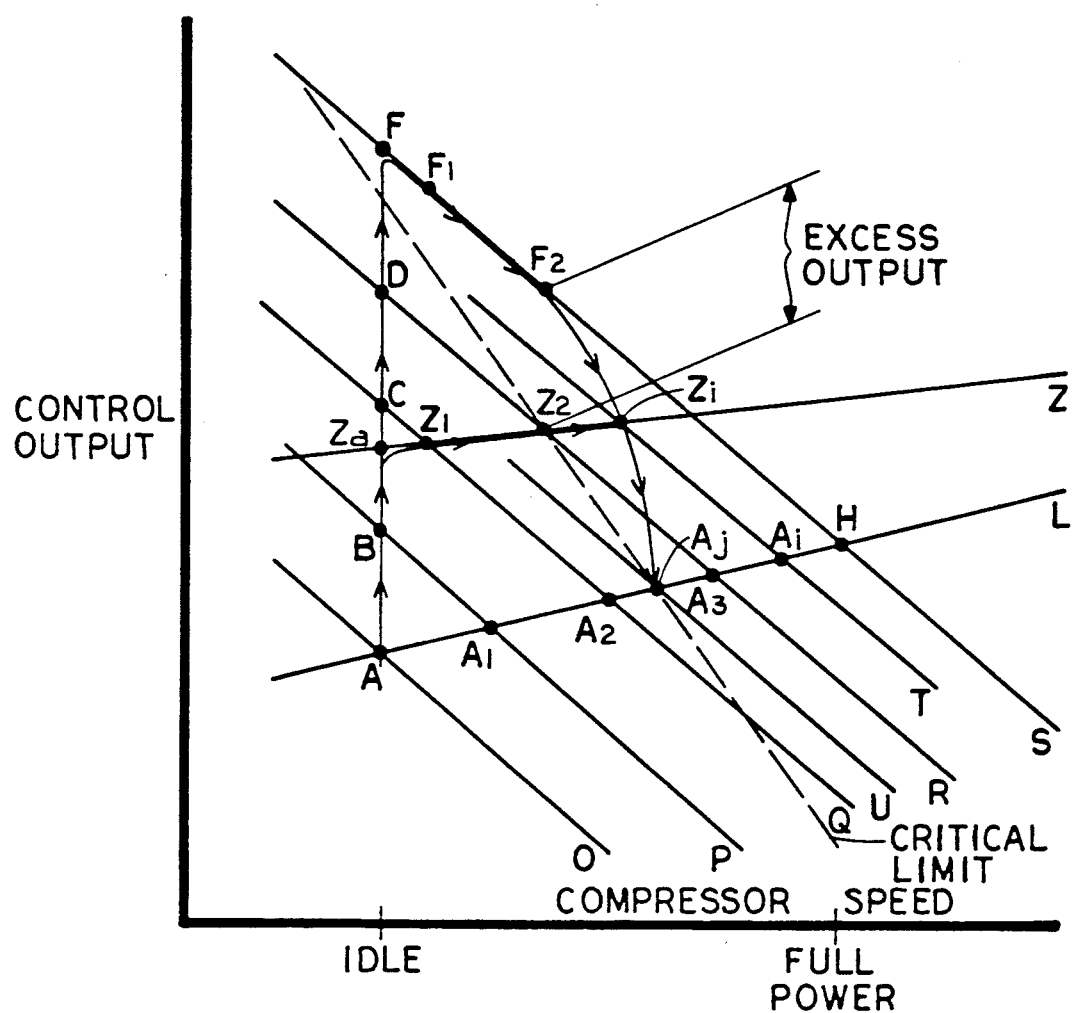
FIG. 4 is a graph similar to FIG. 3 illustrating the disadvantage inherent in the current method.
Figure 4:
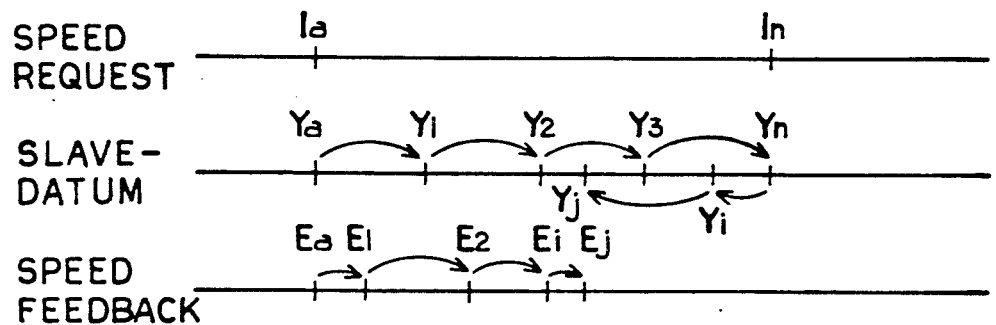
Figure 6:
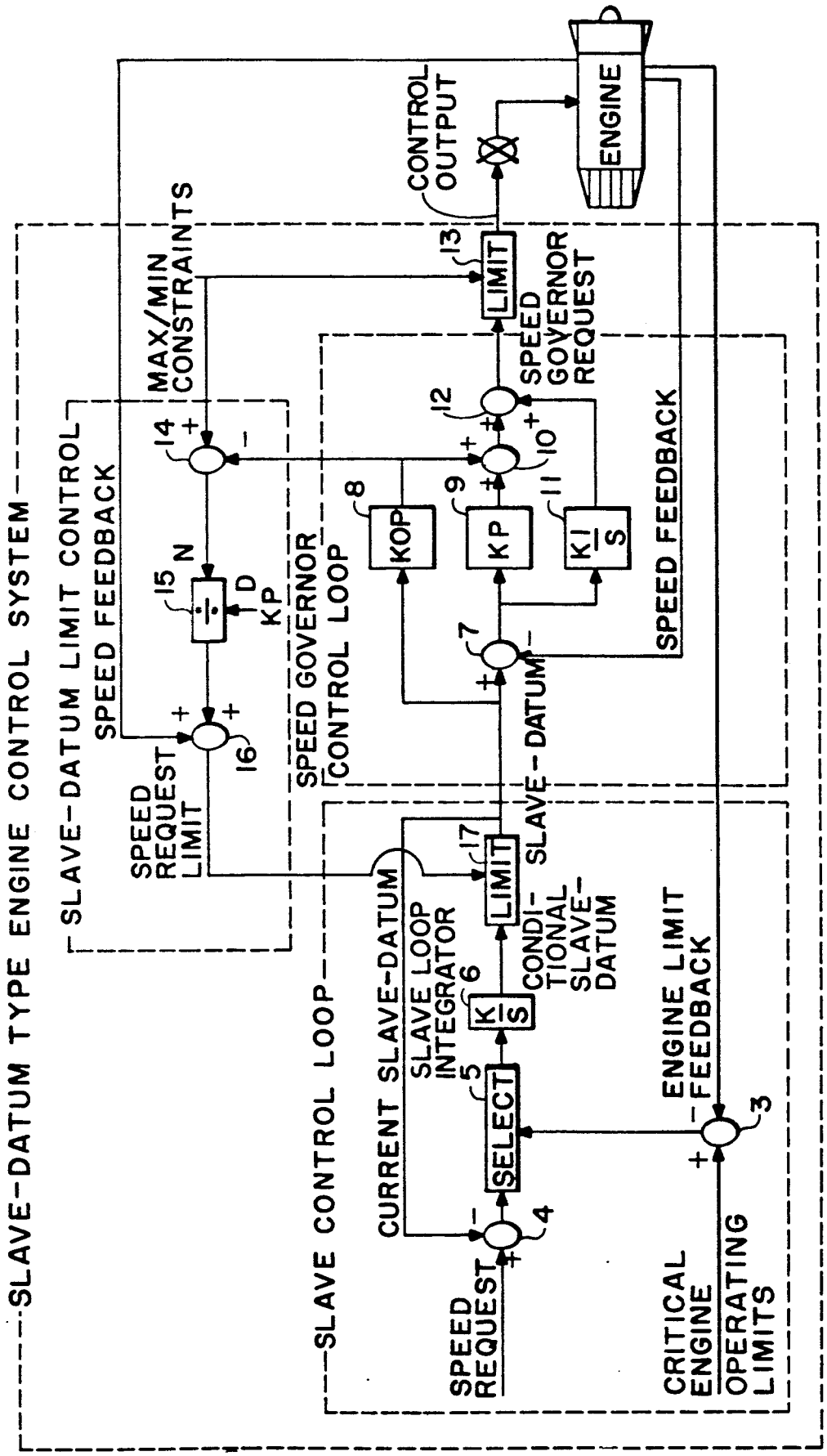
FIG. 6 is a block diagram showing the logic circuitry of FIG. 2 employing the invention.

FIG. 6 shows the logic circuitry of the prior art system of FIG. 2 with the addition of the "Slave-Datum Limit Control". The following equation is the calculation performed by the "Slave-Datum Limit Control".

Speed Request Limit =            [Equation #1]

(("MAX/MINCONSTRAINT") −

(KOPx"SLAVE-DATRUM"))/KP +

("SPEED FEEDBACK")

Where:

MAX/MIN CONSTRAINTS (block 13, summer 14). At block 13, the constraints are limits imposed for consideration of stall margin and combustor blowout during gross transient idle to/from full power operation. At summer 14, the constraints are used in the "Slave-Datum Limit Control" when calculating the distance from the engine operating point (described below) to the MAX/MIN constraints.

KOP (block 8) is the slope of the engine operating line. The operating line is the relationship between engine speed and control output required to maintain steady state operation.

KOPx"SLAVE-DATUM" (output of block 8) is the scheduled engine operating point required for steady state operation at the speed requested by the slave-datum. It is used in the "Slave-Datum Limit Control", at summer 14, when calculating the distance to the MAX/MIN constraints.

("MAX/MIN CONSTRAINTS")−(KOPx"SLAVE-DATUM") (summer 14) is the distance from the steady state engine operating point to the MAX/MIN constraints at the speed requested by the slave-datum. This is the additional amount of speed governor request relative to the engine operating point to exactly reach the MAX/MIN constraints.

KP (block 9, divisor 15) is the proportional governor gain which is the slope of the speed governor line. It is used in the "Slave-Datum Limit Control" to convert the distance from the steady state engine operating point to the MAX and MIN constraints into the delta speed required to reach the constraints.

(("MAX/MIN CONSTRAINTS")−(KOPx"SLAVE-DATUM"))/KP (resultant of divisor 15) is the delta speed required, at the speed requested by the slave-datum, to exactly schedule the speed governor request on the MAX/MIN constraints.

(("MAX/MIN CONSTRAINTS")−(KOPx"SLAVE-DATUM"))/KP+(SPEED FEEDBACK) (summer 16). The delta speed is added to speed feedback to obtain the speed request limit.

SPEED REQUEST LIMIT (resultant of summer 16) is the exact speed request required to schedule the speed governor request along the MAX and MIN constraints. The speed request limit is imposed as a limit (block 17) on the conditional slave-datum with the resultant of block 17 called slave-datum.

The conditional slave-datum is the output of the slave loop integrator (block 6). The conditional slave-datum is the integrated result of the difference between speed request and current slave-datum (summer 4), or between the critical engine operating limits and the critical limit feedbacks (summer 3), whichever is selected (block 5).

The speed request limit is only imposed as a limit to the slave-datum when scheduling the speed governor request along the MAX/MIN constraints. During normal steady state operation, the speed request limit is not limiting the slave-datum, but is situated in a position to be imposed as a limit when required. The foregoing will become more apparent from the following description and accompanying drawings.

Figure 7:
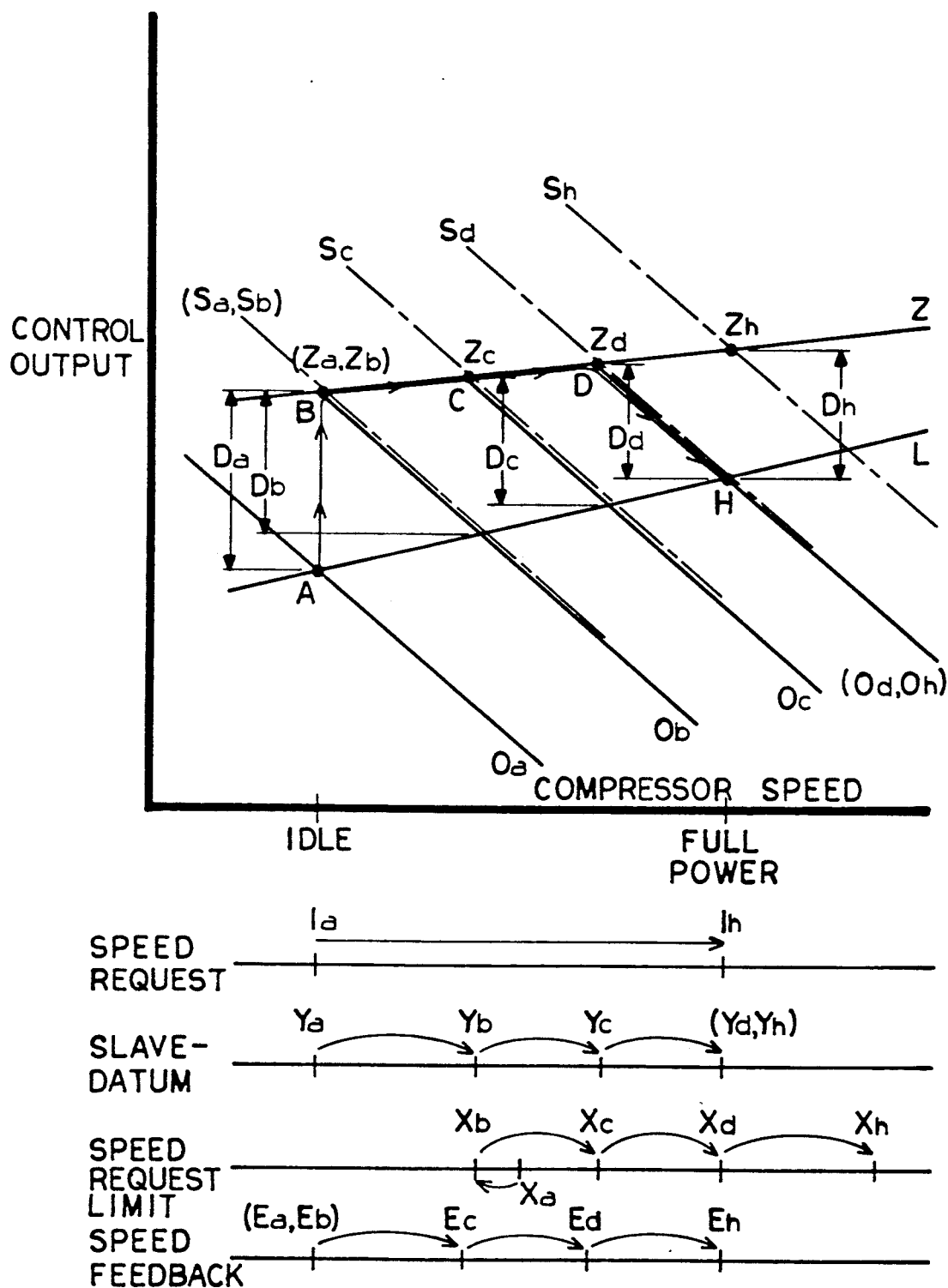
FIG. 7 is a graphical illustration of the slave-datum limit control of FIG. 6.

The steady state operation and transient trajectories of the slave-datum controller employing the "Slave-Datum Limit Control" are graphically illustrated in FIG. 7 which depicts a plot of the control output vs. Compressor speed. The transient operation of the "Slave-Datum Limit Control" is the same whether the engine is accelerating on the maximum constraint or decelerating on the minimum constraint. For sake of convenience and simplicity, only a single direction (acceleration) will be described to illustrate operation.

In FIG. 7, line L represents the engine operating line which is characteristic to a particular engine. KOP (reference FIG. 6) is the slope of line L and will be assumed to be a constant slope throughout the engine operating range. Lines Oa, Ob, Oc, Od, Oh, Sa, Sb, Sc, Sd, and Sh are all speed governor lines. All these lines have a slope of KP (reference FIG. 6) and will be assumed to be a constant slope throughout the engine operating range. Line Z represents the maximum constraint imposed for consideration of stall margin.

Steady state idle operation corresponds to point A, while steady state full power operation corresponds to point H. When at steady state idle operation, the speed request, slave-datum, and the engine feedback positions are all at idle (points Ia, Ya, and Ea respectively, on ordinate axis). The speed governor line (line Oa) is set by the slave-datum and projected through point A on line L at slave-datum speed Ya. Point Za is the MAX constraint level scheduled from line Z, and will be assumed to be a function of only engine feedback position. Since the slave-datum and the engine feedback positions are both at idle, there is no speed error. Therefore, the speed governor request and control output are identical (i.e., the amount corresponding to point A on line L).

As previously stated, the "Slave-Datum Limit Control" is based on the appreciation that the distance from the steady state engine operating point (point A, line L) to the MAX constraint (point Za, line Z) represents the additional amount (difference Da) of speed governor request relative to the engine operating line (line L) to exactly reach the MAX constraint (line Z). This distance is divided by the proportional gain (KP, reference FIG. 6) to obtain a speed delta. In FIG. 7 at this particular instance of steady state idle operation, KP is the slope of speed governor line Sa (dash-dot line). The delta speed is added to speed feedback position (point Ea on ordinate axis) to obtain the speed request limit (point Xa on ordinate axis). In other words, the speed request limit (point Xa on ordinate axis) is the resultant of the intersection of the horizontal line originating from point A and the dash-dot line (line Sa) projecting, at a slope of KP, from point Za. The dash-dot line Sa is the speed governor line set by the speed request limit at the speed request limit position Xa.

As shown, the speed request limit (point Xa) has not yet been imposed as a limit to the slave-datum (point Ya), but is situated in a position to be imposed as a limit when required.

The transient trajectory of the "Slave-Datum Limit Control" is also illustrated in FIG. 7. During a rapid change in speed request (i.e., transient) from idle to full power, the speed request moves immediately and requests full power speed (point Ih on ordinate axis). The speed request limit adjusts as the slave-datum position, the speed feedback position, the MAX constraint level, and the proportional gain (KP) change throughout the transient. However, to simplify the description of how the invention functions, it will be assumed the MAX constraint level is a function of only engine feedback position, and that the engine does not accelerate until after the slave-datum becomes limited by the "Slave-Datum Limit Control". Also, it will be assumed the proportional gain (KP) remains constant throughout the engine operating range. Therefore, until the limit is imposed on the slave-datum, the engine feedback position remains at idle and schedules a constant MAX constraint level, and the speed request limit adjusts only to changes in the slave-datum position.

Based on the above assumption, until the slave-datum becomes limited by the "Slave-Datum Limit Control", the engine feedback position remains at idle (points Ea, Eb) and schedules points Za and Zb from line Z. The slave-datum, moves as shown on the ordinate axis by arrowed line YaYb. A speed error is generated between the slave-datum and speed feedback positions, which results in speed governor lines Oa, and Ob scheduling speed governor request points A, and B respectively.

The corresponding trajectory of the speed request limit is arrowed line XaXb with respective speed governor "limit" lines Sa and Sb (lines Sa and Sb are in the same positions). The speed request limit adjusts from point Xa to Xb due only to the slave-datum position changing from point Ya to Yb. The MAX constraint level and engine feedback position remain constant, but since the slave-datum position changes, the distance from the operating line (line L) to the MAX constraint (line Z) changes (delta Da to Db) which adjusts the speed request limit (Xa to Xb).

The slave-datum becomes limited by the speed request limit when their ordinate axis positions lie along the same vertical. In other words, at points Yb and Xb. The speed governor line (Ob) is effectively limited by the speed governor "limit" line (dash-dot line Sa) set by the speed request limit, thus exactly positioning the speed governor request (point B) on the MAX constraint. The control output is also the amount corresponding to point B.

As the engine accelerates (points Eb, Ec, Ed), the speed request limit (points Xb, Xc, Xd with respective speed governor "limit" lines Sb, Sc, and Sd) adjusts to changes in speed feedback position (points Eb, Ec, and Ed), and the distance to the MAX constraint (deltas Db, Dc, Dd). The speed request limit increases which allows the slave-datum to approach requested full power speed (points Yb, Yc, Yd). The speed governor lines Ob, Oc, and Od schedule the speed governor request (points B, C, D) exactly along the MAX constraint (line Z). From point D to H, the slave-datum remains at full power speed (point Yh equals Yd). The speed governor line Oh, therefore, remains in the same position as line Od. As the engine accelerates from point Ed to Eh, the speed governor request moves from point D to H, while the distance to the MAX constraint changes from Dd to Dh. This result moves the speed request limit from point Xd to point Xh on the ordinate axis, thus no longer imposed as a limit on the slave-datum.

As the engine accelerates from idle to full power, the speed governor request and the control output are both scheduled along arrowed line ABCDH. Therefore, there is no slave-datum windup, no excess output generated, and no loss of transient response.

A similar result occurs during a snap change in speed request from full power to idle. Since the "Slave-Datum Limit Control" operates the same whether the engine is acceling or deceling, the function was demonstrated in only one direction (acceleration direction).

Figure 8:
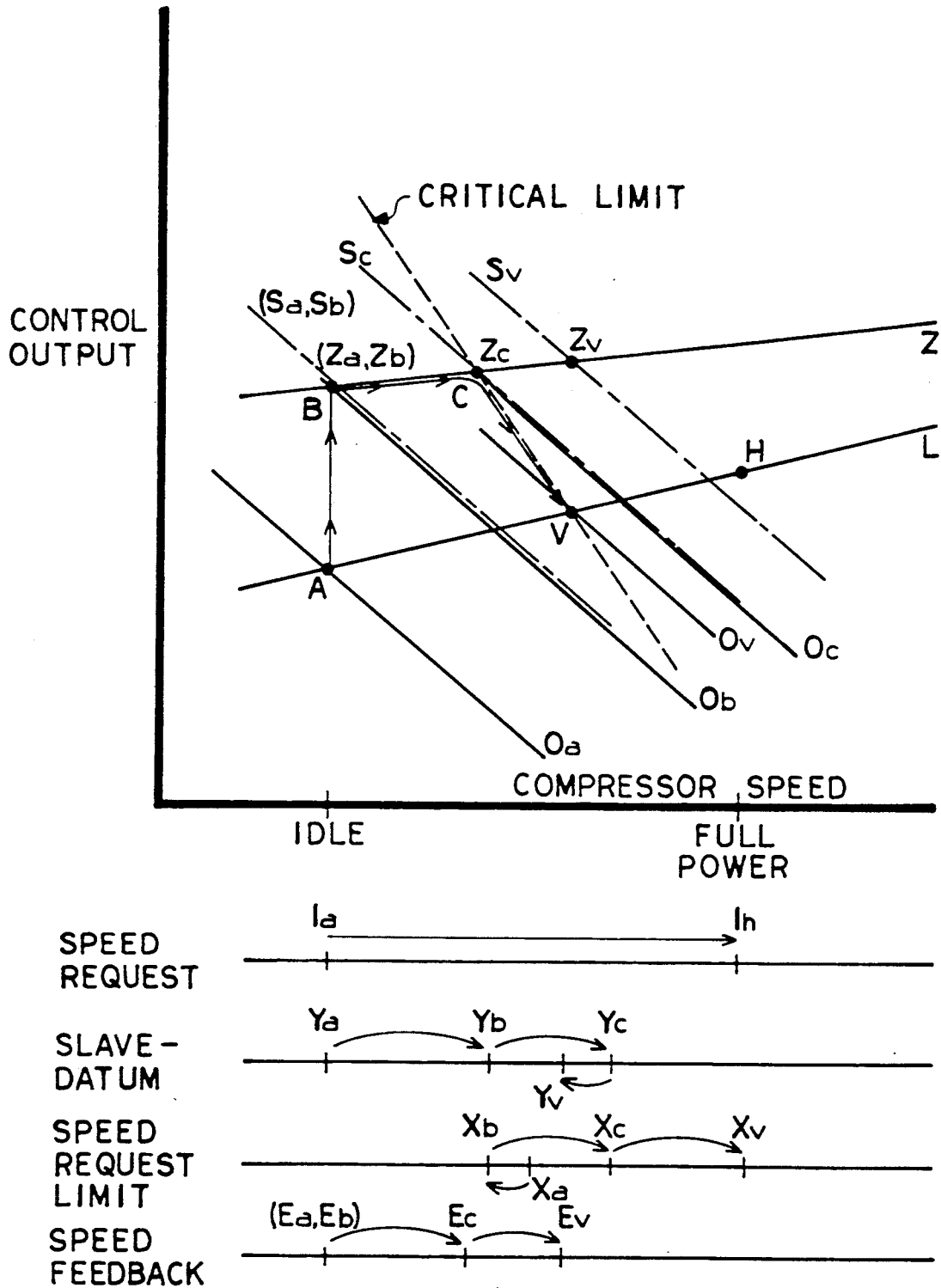
FIG. 8 is a graphical illustration of the slave-datum limit control of FIG. 6 demonstrating the features of the controller when controlling to a critical engine limit.

FIG. 8 demonstrates the advantage of the "Slave-Datum Limit Control" when controlling to a critical engine operating limit. In FIG. 8, the dashed line represents the critical limit. During a snap change in speed request from idle to full power, the trajectories of the speed request, slave-datum, speed request limit, speed feedback, MAX constraint, speed governor request, and control output are identical to the FIG. 7 description until the critical operating limit is reached.

The critical limit is reached at the point where the dashed line and the maximum constraint intersect (point C). The slave-datum, speed request limit, and speed feedback are at points Yc, Xc, and Ec respectively. Since the speed governor request is exactly scheduled along the maximum constraint (point B to C), there is no slave-datum windup and no excess output generated. Therefore, as the slave control loop trims back the slave-datum (points Yc to Yv with respective speed governor lines Oc, Ov) toward the accelerating speed feedback position (point Ec to Ev), the engine responds immediately to control action, and thus neither continues to ride the MAX constraint, nor exceed the critical limit. As the slave-datum is trimmed from point Yc to Yv and the speed feedback position accelerates from point Ec to Ev, the speed governor request is scheduled along the critical limit (point C to V along dashed line). At the same instance, the speed request limit is moved from point Xc to Xv with respective speed governor limit lines Sc and Sv, thus no longer imposed as a limit on the slave-datum. Steady state engine operation will occur at point V on line L.

As the engine accelerates from idle to steady state operation on the critical limit, the speed governor request and the control output are both scheduled along arrowed line ABCV. Therefore, there is no slave-datum windup, no excess output generated, and no overshoot of the critical limit.

Another feature of this invention is that the maximum and minimum constraints can also be engine limits required for successful engine starts. It is obvious from the foregoing description, that the "Slave-Datum Limit Control" will operate independent of whether the MAX/MIN constraints are limits imposed for considerations of stall margin and combustor blowout, or are limits required to allow successful starts to minimum temperature, pressure, or speed levels.

Although this invention has been shown and described with respect to detailed embodiments thereof, it will be understood by those skilled in the art that various changes in form and detail thereof may be made without departing from the spirit and scope of the claimed invention.

I claim:

1. For a gas turbine engine having fuel metering means for delivering fuel to the engine and including means for controlling said fuel metering means including speed control means, a slave-datum control responsive to a speed request signal and limit signal for limiting said fuel metering means for producing a signal that is integrated with respect to time for controlling said speed control means, and slave-datum limit control means for further limiting said slave-datum control so that its output is indicative of the maximum or minimum constraints of said engine during the engine's acceleration and deceleration modes of operation whereby the windup effect on said speed control means is eliminated, the output produced by said slave-datum limit control means is a function of the formula:

$$[(\text{maximum constraint}) - (KOP \times \text{"slave-datum"})]/KP + \text{speed feedback},$$

where:
 maximum constraint is the surge limit of said gas turbine engine,
 $KOP \times$"slave-datum" is the scheduled engine operating point required for steady state engine operation,
 KP is the proportional gain of an engine governor,
 KOP is the slope of an engine operating line and speed feedback is indicative of the rotational speed of said gas turbine engine.

2. For a gas turbine engine as claimed in claim 1 wherein said formula includes the minimum constraint where minimum constraint is where blowout of the combustor in said gas turbine engine occurs.

3. A control system for controlling the amount of fuel being delivered to a gas turbine engine including speed control means, a slave-datum control responsive to a speed request signal and limit signal for controlling said speed control means, and slave-datum limit means for further limiting said slave-datum control during the engine's acceleration and deceleration modes of operation whereby the windup effect on said speed control means is eliminated in accordance with the following formula:

$$[(\text{maximum constraint}) - (KOP \times \text{"slave-datum"}]/KP + \text{speed feedback},$$

where:
 maximum constraint is the surge limit of said gas turbine engine,
 $KOP \times$"Slave-Datum" is the scheduled engine operating point required for steady state engine operation,
 KP is the proportional gain of said governor, KOP is the slope of said operating line and
 speed feedback is indicative of the rotational speed of said gas turbine engine.

4. For a gas turbine engine as claimed in claim 3 wherein said formula includes the minimum constraint where minimum constraint is where blowout of the combustor in said gas turbine engine occurs.

5. For a gas turbine engine having fuel metering means for delivering fuel to the engine and including control means for controlling said fuel metering means in response to an engine operating parameter, a slave-datum control responsive to an engine request signal and limit signal for limiting said fuel metering means for producing a signal that is integrated with respect to time for controlling said control means, and slave-datum limit control means for further limiting said slave-datum control so that its output is indicative of the maximum or minimum constraints of said engine during the engine's acceleration and deceleration modes of operation whereby the windup effect on said control means is eliminated the output produced by said slave-datum limit control means is a function of the formula:

$$[(\text{maximum constraint}) - (KOP \times \text{"slave-datum"})]/KP + \text{feedback},$$

where:
 maximum constraint is the surge limit of said gas turbine engine,
 $KOP \times$"slave-datum" is the scheduled engine operating point required for steady state engine operation,
 KOP is the slope of the line of said operating parameter taken as a function of the output of said control means,
 KP is the proportional gain of an engine parameter governor, and
 feedback is indicative of said engine operating parameter.

6. For a gas turbine engine as claimed in claim 5 wherein said formula includes the minimum constraint where minimum constraint is where blowout of the combustor in said gas turbine engine occurs.

* * * * *

UNITED STATES PATENT AND TRADEMARK OFFICE
CERTIFICATE OF CORRECTION

PATENT NO. : 5,134,845
DATED : August 4, 1992
INVENTOR(S) : Timothy J. Romano

It is certified that error appears in the above-indentified patent and that said Letters Patent is hereby corrected as shown below:

Column 3, line 55, "(F1-F1) should read --(F1-Z1)-- .

Signed and Sealed this

Twenty-eighth Day of December, 1993

Attest:

BRUCE LEHMAN

Attesting Officer

Commissioner of Patents and Trademarks